United States Patent [19]

Simar, Jr.

[11] Patent Number: 5,109,351

[45] Date of Patent: Apr. 28, 1992

[54] LEARNING DEVICE AND METHOD

[75] Inventor: L. Ray Simar, Jr., Richmond, Tex.

[73] Assignee: Texas Instruments Incorporated, Dallas, Tex.

[21] Appl. No.: 396,585

[22] Filed: Aug. 21, 1989

[51] Int. Cl.$^5$ ............................................. G06F 15/18
[52] U.S. Cl. ........................................ 395/24; 395/21; 395/27; 395/800
[58] Field of Search .................. 364/513, 200; 307/201
[56] References Cited

U.S. PATENT DOCUMENTS 4,807,168  2/1989  Moopenn et al. .................... 364/513

OTHER PUBLICATIONS

Rumelhart et al., Learning Internal Representations by Error Propagation, "Parallel Distributed Processing: Exploration in the Microstructure of Cognition", vol. 1: Foundations, pp. 318–362 (MIT Press, 1986).

Primary Examiner—Allen R. MacDonald
Attorney, Agent, or Firm—Melvin Sharp; James T. Comfort; N. Rhys Merrett

[57] ABSTRACT

Layered arrays of nearest-neighbor connected computation cells plus an error computation layer provide a learning network.

8 Claims, 10 Drawing Sheets

LEARNING DEVICE AND METHOD

BACKGROUND OF THE INVENTION

1. Field of the Invention

The present invention relates to parallel processing, and, more particularly, to learning methods in devices such as neural networks with hidden units.

2. Description of the Related Art

Attempts to understand the functioning of the human brain have led to various "neural network" models in which large numbers of neurons are interconnected with the inputs to one neuron basically the outputs of many other neurons. These models roughly presume each neuron exists in one of two states (quiescent and firing) with the neuron's state determined by the states of the connected input neurons (if enough connected input neurons are firing, then the original neuron should switch to the firing state). Some models provide for feedback so that the output of a neuron may affect its input, and in other models outputs are only fed forward.

In a feedforward neural network, one set of neurons are considered input units, another set of neurons are considered output units, and, optionally, other neurons are considered hidden units. In such a situation, input patterns would stimulate input units which in turn would stimulate various layers of hidden units which then would stimulate output units to form an output. The aspect of learning in the human brain can be mimicked in neural networks by adjusting the strength of the connections between neurons, and this has led to various learning methods. For neural networks with hidden units there have been three basic approaches: (1) competitive learning with unsupervised learning rules employed so that useful hidden units develop, although there is no external force to insure that appropriate hidden units develop; (2) prescription of the hidden unit structure on some a priori grounds; and (3) development of learning procedures capable of leading to hidden unit structure adequate for the problem considered. See generally D. E. Rumelhart, G. E. Hinton, and R. J. Williams, "Learning Internal Representations by Error Propogation," *Parallel Distributed Processing: Exploration in the Microstructure of Cognition, Volume 1: Foundations*, pp. 318-362 (MIT Press, 1986) where a backward pass learning method is described and which is called the "generalized delta rule". The generalized delta rule basically has a neural network learn the correct outputs to a set of inputs by comparing actual outputs with correct outputs and modifying the connection strengths by a steepest descent method based on the differences between actual outputs and correct outputs.

However, the generalized delta rule has the problems of standard implementation with electronic devices does not directly lead to a compact architecture. Rather, the generalized delta rule leads to an architecture that focuses on the forward pass much more than the backward pass, and it is not clear how the same structural units would be used for both the forward pass computations and the backward pass computations. Indeed, the generalized delta rule is most often viewed as implementable by EEPROMs.

SUMMARY OF THE INVENTION

The present invention provides backward pass learning methods for feedforward neural network type devices and network architectures for these methods that use only local calculations and communications. Preferred embodiment architectures include nearest neighbor processor arrays that are expandable simply by addition of more processors to the arrays. Common processing for the forward and backward pass computations permits simple architecture, and various device types may be used for the processors such as general purposes processors, discrete digital procesors, analog processors, and quantum effect devices.

BRIEF DESCRIPTION OF THE DRAWINGS

The drawings are schematic for clarity.

DESCRIPTION OF THE PREFERRED EMBODIMENTS

Figure 1:
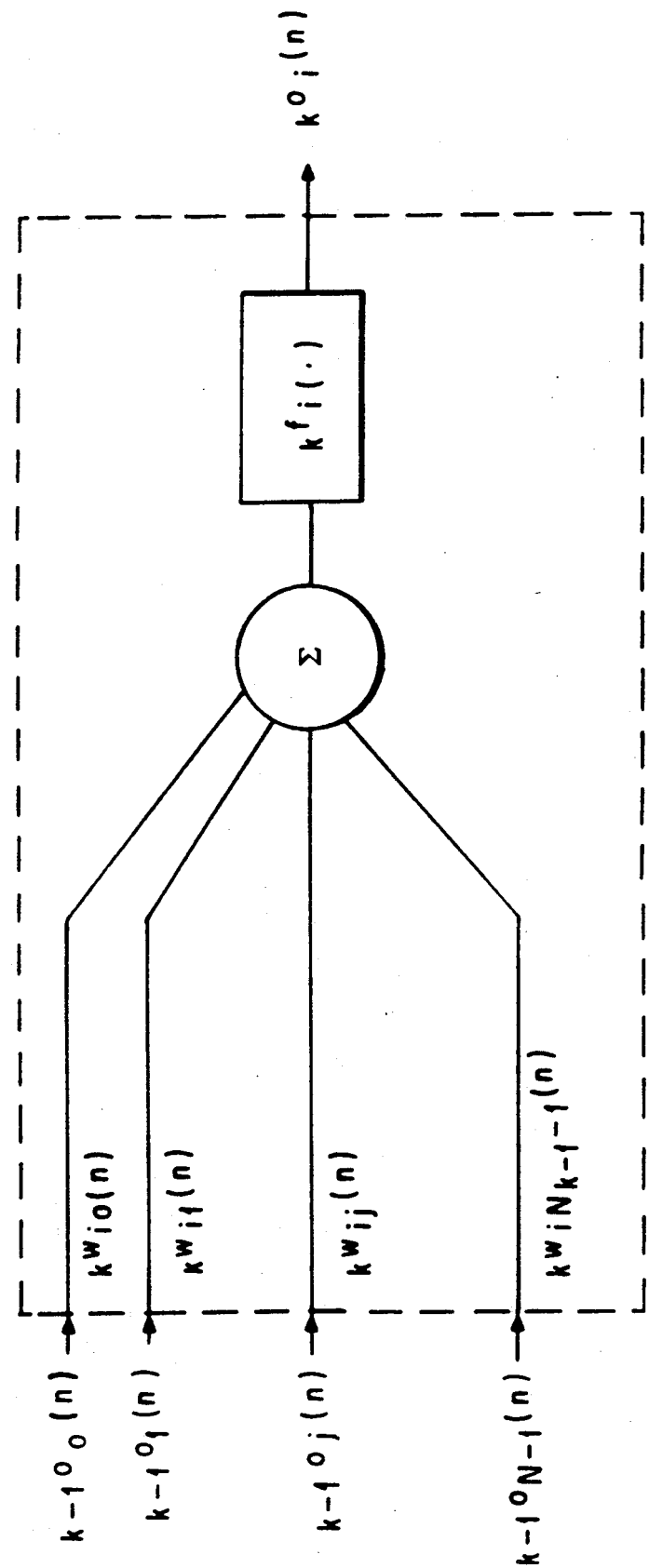
FIG. 1 illustrates a basic unit of computation for a forward pass.
Figure 2:
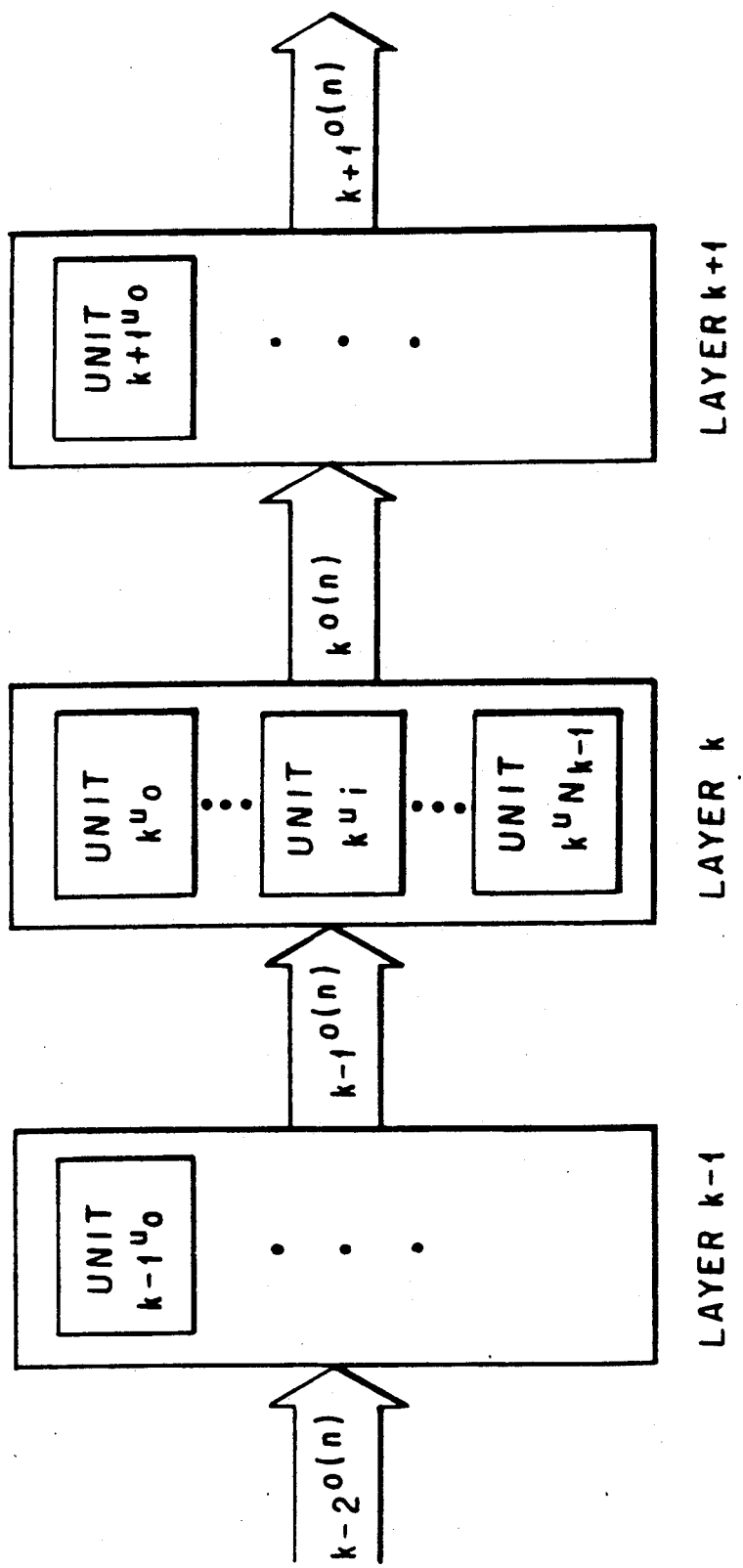
FIG. 2 shows the forward pass layers in a learning network.

The generalized delta-rule (GDR) is a learning rule that can be applied to multilayer decision making neural networks. The network form is really quite simple. The network is composed of sequential layers. The first layer receives an input, processes this input in a predefined way and outputs it to the second level. The process of a level receiving an input, processing it, and passing it on to the next level, continues until the last layer which produces the output of the network. Each layer is composed of multiple neurons (units) which we refer to as forward-pass computational units. It is in these units the processing is performed as data passes forward through the network. FIG. 1 illustrates the basic structure of a forward pass computational unit (within the broken lines), and FIG. 2 illustrates the layered nature of the network.

We will find it very important to precisely define a notation for describing these networks. This notation is key to successfully manipulating the relationships between layers, units, and the computations performed by the units. Referring to FIG. 2, unit i in layer k is referred to as $_kU_i$. Similarly, $_kO_j(n)$ is the output of unit j in layer k at "time" n, and $_kW_{ij}(n)$ is the weight of the connection from unit j in layer k−1 (unit $_{k-1}U_j$) to unit i in layer k (unit $_kU_i$) at time n.

The "output" $_{-1}O_j(n)$ is the input to the system. The number of units (outputs) in layer k is denoted as $N_k$, and the units are labelled $0, 1, 2, \ldots, N_k$. The maximum number of inputs per cell in layer k is given by the number of units in the previous layer k−1 which is $N_{k-1}$. Throughout this analysis we will assume that there are K forward-pass layers in the network which are labelled $0, 1, 2, \ldots, K-1$. The forward pass equations which are used to derive the response of the network to an input are:

$$_k o_i(n) = {_k f_i}\left( \sum_{j=0}^{N_{k-1}-1} {_k w_{ij}(n)}\,{_{k-1} o_j(n)} \right) \quad (1)$$

$$= {_k f_i}({_k \text{net}_i(n)}) \quad (2)$$

$$i = 0, 1, \ldots, N_k - 1$$
$$k = 0, 1, \ldots, K - 1$$

Figure 3A:
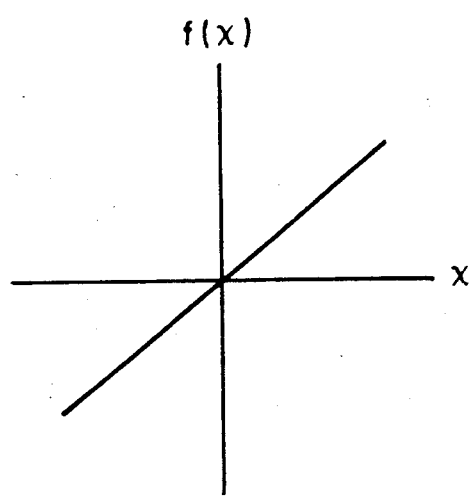
FIGS. 3a and b illustrate semilinear functions.
Figure 3B:
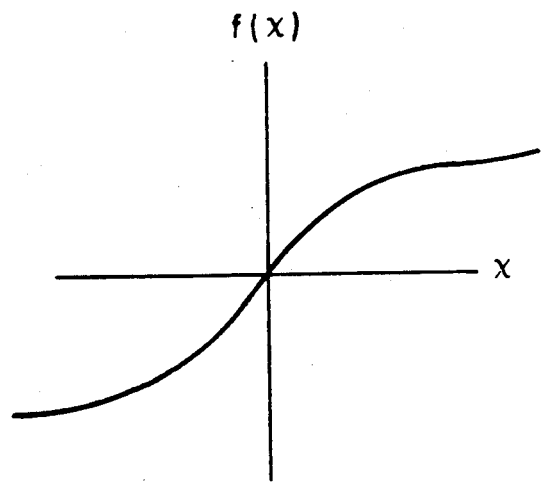

In equation (1) the function $_k f_i(.)$ is a semilinear function. A semilinear function (examples illustrated in FIG. 3) is nondecreasing and differentiable. Later we will find it useful to make this function not simply nondecreasing but also a strictly monotonically increasing function.

Implicit in the new notation used in equation (1) is the propagation inherent in the networks being analyzed since we note that $_k o_i(n)$ cannot be calculated until we have determined $_{k-1} o_j(n)$. In other words, the output of layer k cannot be determined until the output of layer k — 1 has been determined. Our propagation begins with layer 0 and $_{-1} o_j(n)$ which are the inputs we assume we are given.

The definition of $_k \text{net}_i(n)$ is also important:

$$_k \text{net}_i(n) = \sum_{j=0}^{N_{k-1}-1} {_k w_{ij}(n)}\,{_{k-1} o_j(n)} \quad (3)$$

We can consider $_k \text{net}_i(n)$ to be the strictly-linear portion of the response of a unit. This term will be of great importance to us later.

We will often times find it very useful to express equations (1), (3), and other results we derive in vector form. So, let us define several very useful vector quantities. First, let us organize the weights for a particular layer in a matrix form. We will refer to this matrix of weights for a particular layer k as $_k W(n)$ and define it to be:

$$_k W(n) = \begin{bmatrix} {_k w_{00}(n)} & {_k w_{01}(n)} & \cdots & {_k w_{0(N_{k-1}-1)}(n)} \\ {_k w_{10}(n)} & {_k w_{11}(n)} & & \\ \vdots & & & \\ {_k w_{(N_k-1)0}(n)} & & \cdots & {_k w_{(N_k-1)(N_{k-1}-1)}(n)} \end{bmatrix} \quad (4)$$

Thus we see that $_k W(n)$ is a $N_k \times N_{k-1}$ matrix. Notice that row i of $_k W(n)$ is the set of weights associated with unit $_k u_i$ at time n.

The output vector $_k o(n)$ is an $N_k$ element vector composed of the outputs of all of the units $_k u_j$ at time n:

$$_k o(n) = \begin{bmatrix} {_k o_0(n)} \\ {_k o_1(n)} \\ \vdots \\ {_k o_{N_k-1}(n)} \end{bmatrix} \quad (5)$$

The vector $_k \text{net}(n)$ is an $N_k$ element vector composed of the $_k \text{net}_i(n)$ terms of all of the units $_k u_j$ at time n:

$$_k \text{net}(n) = \begin{bmatrix} {_k \text{net}_0(n)} \\ {_k \text{net}_1(n)} \\ \vdots \\ {_k \text{net}_{N_k-1}(n)} \end{bmatrix} \quad (6)$$

We will also need a vector function operation $_k f(\ )$ which we define as:

$$_k f({_k \text{net}(n)}) = \begin{bmatrix} {_k f_0}({_k \text{net}_0(n)}) \\ {_k f_1}({_k \text{net}_1(n)}) \\ \vdots \\ {_k f_{N_k-1}}({_k \text{net}_{N_k-1}(n)}) \end{bmatrix} \quad (7)$$

As defined here, applying $_k f(\ )$ to a vector uses the function $_k f_j(\ )$ to operate on the $j^{th}$ element of a vector and yields the results as a vector.

Using this vector notation, equation (1) becomes:

$$_k o(n) = {_k f}({_k W(n)}\,{_{k-1} o(n)}) \quad (8)$$
$$= {_k f}({_k \text{net}(n)}) \quad (9)$$

and equation (3) becomes $$_k \text{net}(n) = {_k W(n)}\,{_{k-1} o(n)} \quad (10)$$

A learning network does not only produce output signals. It must also learn from its mistakes. The algorithm for learning from mistakes is derived next. Let us introduce a measure of the error $E(_k w_{ij}(n))$ which is some, as yet undefined, measure of the error of the network due its response $_{K-1} o(n)$ after receiving the input $_{-1} o(n)$. We also assume that the only means for controlling this error is by the manipulation of the weights $_k w_{ij}(n)$. Furthermore, let us assume that we will use a method of steepest-descent in order to update the weights in a network based upon the error. Thus, our general approach is to update the weights according to the following relationship:

$$_k w_{ij}(n+1) = {_k w_{ij}(n)} - \eta \frac{\partial E(_k w_{ij}(n))}{\partial {_k w_{ij}(n)}} \quad (11)$$

Of course, $$\frac{\partial E(_k w_{ij}(n))}{\partial {_k w_{ij}(n)}}$$

is the component of the gradient of the error term with respect to the network weight $_k w_{ij}(n)$, and $\eta$ is the learning rate. If the learning rate is taken to be small, then many passes through the network will be required; whereas, if the learning rate is take to be large, then oscillations may occur. We will find it convenient to treat the gradient as a matrix $\nabla_k E(n)$. For a particular layer k we define this as an $N_k \times N_{k-1}$ matrix (the same dimensions as $_k W(n)$) defined as follows:

$$\nabla_k E(n) = \quad (12)$$

$$\begin{bmatrix} \frac{\partial E(_kw_{ij}(n))}{\partial_k w_{00}(n)} & \frac{\partial E(_kw_{ij}(n))}{\partial_k w_{01}(n)} & \cdots & \frac{\partial E(_kw_{ij}(n))}{\partial_k w_{0(N_k-1-1)}(n)} \\ \frac{\partial E(_kw_{ij}(n))}{\partial_k w_{10}(n)} & \frac{\partial E(_kw_{ij}(n))}{\partial_k w_{11}(n)} & & \\ \cdots & \cdots & \cdots & \\ \frac{\partial E(_kw_{ij}(n))}{\partial_k w_{(N_k-1)0}(n)} & & \cdots & \frac{\partial E(_kw_{ij}(n))}{\partial_k w_{(N_k-1)(N_k-1-1)}(n)} \end{bmatrix}$$

Similar to the meaning of $_kW(n)$, each row $i$ of the matrix $\nabla_k E(n)$ represents the change in $E(_kw_{ij}(n))$ as a function of the weights associated with unit $_ku_i$. This then leads to a matrix form of the update equation (11):

$$_kW(n+1) = {_kW(n)} - \eta \nabla_k E(n) \qquad (13)$$

Our problem is how to efficiently calculate the gradient matrix $\nabla_k E(n)$. To do this we must first have a better understanding of $$\frac{\partial E(_kw_{ij}(n))}{\partial_k w_{ij}(n)}.$$

We note from the chain rule that:

$$\frac{\partial E(_kw_{ij}(n))}{\partial_k w_{ij}(n)} = \frac{\partial E(_kw_{ij}(n))}{\partial_k \text{net}_j(n)} \frac{\partial_k \text{net}_j(n)}{\partial_k w_{ij}(n)} \qquad (14)$$

Now let us consider the two terms on the right side of equation (14). From the definition of $_k\text{net}_j(n)$ we see that:

$$\frac{\partial_k \text{net}_j(n)}{\partial_k w_{ij}(n)} = \frac{\partial}{\partial_k w_{ij}(n)} \left( \sum_{j=0}^{N_{k-1}-1} {_k w_{ij}(n)} {_{k-1} o_j(n)} \right) \qquad (15)$$

$$= {_{k-1} o_j(n)} \qquad (16)$$

Now we introduce a new definition:

$$_k \delta_j(n) = \frac{\partial E(_kw_{ij}(n))}{\partial_k \text{net}_j(n)} \qquad (17)$$

The vector $_k\delta(n)$ is an $N_k$ element vector composed of the $_k\delta_j(n)$ terms of all of the units $_ku_i$ in row $k$ at time $n$:

$$_k\delta(n) = \begin{bmatrix} _k\delta_0(n) \\ _k\delta_1(n) \\ \vdots \\ _k\delta_{N_k-1}(n) \end{bmatrix} \qquad (18)$$

Using the definition of $_k\delta_j(n)$ we can write:

$$\frac{\partial E(_kw_{ij}(n))}{\partial_k w_{ij}(n)} = {_k\delta_j(n)} {_{k-1} o_j(n)} \qquad (19)$$

Using equation (19) and the definitions of $\nabla_k E(n)$, $_k\delta(n)$, and $_k o(n)$ we can say:

$$\nabla_k E(n) = {_k\delta(n)} {_{k-1} o^T(n)} \qquad (20)$$

Now let us look at the $_k\delta_j(n)$ term in a little more detail. Again, using the trusty chain-rule, we write:

$$_k\delta_j(n) = \frac{\partial E(_kw_{ij}(n))}{\partial_k \text{net}_j(n)} = \frac{\partial E(_kw_{ij}(n))}{\partial_k o_j(n)} \frac{\partial_k o_j(n)}{\partial_k \text{net}_j(n)} \qquad (21)$$

The term $$\frac{\partial E(_kw_{ij}(n))}{\partial_k o_j(n)}$$

is a measure of the dependency of the error on the output of unit $j$ in layer $k$. The term $$\frac{\partial_k o_j(n)}{\partial_k \text{net}_j(n)}$$

is a measure in the change of the output due to the 'net' weighted inputs.

Since $$_k o_j(n) = {_kf(_k\text{net}_j(n))} \qquad (22)$$

then $$\frac{\partial_k o_j(n)}{\partial_k \text{net}_j(n)} = {_kf'(_k\text{net}_j(n))} \qquad (23)$$

Recall that previously we assumed $_kf()$ was differentiable, so we know that the derivative in (23) exists. Therefore:

$$_k\delta_j(n) = \frac{\partial E(_kw_{ij}(n))}{\partial_k o_j(n)} {_kf'(_k\text{net}_j(n))} \qquad (24)$$

We will now see how to calculate any $_{k-1}\delta_j(n)$ given $_k\delta_j(n)$. For a particular layer $k-1$ we seek $$\frac{\partial E(_kw_{ij}(n))}{\partial_{k-1} o_j(n)}.$$

Using the chain rule we write:

$$\frac{\partial E(_kw_{ij}(n))}{\partial_{k-1} o_j(n)} = \sum_{i=0}^{N_k-1} \frac{\partial E(_kw_{ij}(n))}{\partial_k \text{net}_j(n)} \frac{\partial_k \text{net}_j(n)}{\partial_{k-1} o_j(n)} \qquad (25)$$

$$= \sum_{i=0}^{N_k-1} \frac{\partial E(_kw_{ij}(n))}{\partial_k \text{net}_j(n)} \left( \frac{\partial}{\partial_{k-1} o_j(n)} \sum_{j=0}^{N_{k-1}-1} {_k w_{ij}(n)} {_{k-1} o_j(n)} \right)$$

$$= \sum_{i=0}^{N_k-1} \frac{\partial E(_kw_{ij}(n))}{\partial_k \text{net}_i(n)} \,_kw_{ij}(n)$$

$$= \sum_{i=0}^{N_k-1} {}_kw_{ij}(n)_k\delta_i(n) \tag{26}$$

This sum is a very important term which we, much like in the definition $_k\text{net}_i(n)$, will define as $_{k-1}\text{delta}_j(n)$:

$$_{k-1}\text{delta}_j(n) = \sum_{i=0}^{N_k-1} {}_kw_{ij}(n)_k\delta_i(n) \tag{27}$$

$$_k\text{net}_i(n) = \sum_{j=0}^{N_{k-1}-1} {}_kw_{ij}(n)_{k-1}o_j(n)$$

Writing $_{k-1}\text{delta}_j(n)$ in matrix form we get:

$$_{k-1}\text{delta}(n) = {}_kW^T(n)_k\delta(n) \tag{28}$$

Returning to (24), and using the result of (26), we can now write:

$$_{k-1}\delta_j(n) = \frac{\partial E(_kw_{ij}(n))}{\partial_{k-1}o_j(n)} \,_{k-1}f_j'(_{k-1}\text{net}_j(n)) \tag{29}$$

$$= {}_{k-1}f_j'(_{k-1}\text{net}_j(n)) \sum_{i=0}^{N_k-1} {}_kw_{ij}(n)_k\delta_i(n) \tag{30}$$

$$= {}_{k-1}f_j'(_{k-1}\text{net}_j(n))_{k-1}\text{delta}_j(n) \tag{31}$$

Equation (31) is a very important equation. Inherent in this equation is the flow of the calculation necessary to determine $_{k-1}\delta_j(n)$. It explicitly shows that $_{k-1}\delta_j(n)$ may not be calculated until $_k\delta_i(n)$ has been determined. This structure is very similar to the structure found in equation (1) which showed that the $_ko_i(n)$ may not be calculated until $_{k-1}o_j(n)$ is determined.

In matrix notation equation (31) becomes $$_{k-1}\delta(n) = \text{diag}(_{k-1}f'(_{k-1}\text{net}(n)))_kW^T(n)_k\delta(n) \tag{32}$$

-continued
$$= \text{diag}(_{k-1}f'(_{k-1}\text{net}(n)))_{k-1}\text{delta}(n) \tag{33}$$

In equation (33) we have used $\text{diag}(_{k-1}f'(_{k-1}\text{net}(n)))$ to represent the matrix which is all zero except for the diagonal which is composed of the elements of $_{k-1}f'(_{k-1}\text{net}(n))$.

For the final layer $k = K-1$ we calculate, albeit in an unspecified manner, $$\frac{\partial E(_Kw_{ij}(n))}{\partial_{K-1}o_j(n)}.$$

Then we see that, for the last layer $$_{K-1}\delta_j(n) = \frac{\partial E(_Kw_{ij}(n))}{\partial_{K-1}o_j(n)} \,_{K-1}f_j'(_{K-1}\text{net}_j(n)) \tag{34}$$

Using the results of equation (32), given equation (34), we can calculate the error term for all of the layers in a backward pass through the network.

At no point in this derivation have we specified the form of $E(\ )$. In other words, the derivation is completely independent of the particular error criterion used. We will later discuss some of these alternative error measures.

Table 1 is a summary of the scalar and vector equations of the first preferred embodiment method.

We start from the equations in Table 1 in the definition of an error-criterion independent architecture.

Reviewing the equations in Table 1 we observe that much of the computations necessary are localized on a per layer basis. For a layer k we know that we are always given, by a previous calculation, the terms $_{k-1}o_j(n)$ and $_k\delta_i(n)$. We similarly know the weight terms $_kw_{ij}(n)$ and the semilinear function $_kf_i(\ )$. These terms are all local to the layer k.

TABLE 1

| Summary of the scalar and vector equations. | |
|---|---|
| Scalar Equations | Vector Equations |
| Forward pass: | Forward pass: |
| Given input $_{-1}o_j(n)$. | Given input vector $_{-1}o(n)$. |
| $_k\text{net}_i(n) = \sum_{j=0}^{N_{k-1}-1} {}_kw_{ij}(n)_{k-1}o_j(n)$ (3) | $_k\text{net}(n) = {}_kW(n)_{k-1}o(n)$ (10) |
| $_ko_i(n) = {}_kf_i(_k\text{net}_i(n))$ (2) | $_ko(n) = {}_kf(_k\text{net}(n))$ (9) |
| Backward pass: | Backward pass: |
| Calculate $_{K-1}\delta_i(n)$. | Calculate $_{K-1}\delta(n)$. |
| $_{k-1}\text{delta}_j(n) = \sum_{i=0}^{N_k-1} {}_kw_{ij}(n)_k\delta_i(n)$ (27) | $_{k-1}\text{delta}(n) = {}_kW^T(n)_k\delta(n)$ (28) |
| $_{k-1}\delta_j(n) = {}_{k-1}f_j'(_{k-1}\text{net}_j(n))_{k-1}\text{delta}_j(n)$ (31) | $_{k-1}\delta(n) = \text{diag}(_{k-1}f'(_{k-1}\text{net}(n)))_{k-1}\text{delta}(n)$ (33) |
| Update step: | Update step: |
| $\frac{\partial E(_kw_{ij}(n))}{\partial_kw_{ij}(n)} = {}_k\delta_i(n)_{k-1}o_j(n)$ (19) | $\nabla_k E(n) = {}_k\delta(n)_{k-1}o^T(n)$ (20) |

TABLE 1-continued
Summary of the scalar and vector equations.

| Scalar Equations | Vector Equations |
|---|---|
| $_kw_{ij}(n+1) = {_k}w_{ij}(n) - \eta \frac{\partial E(_kw_{ij}(n))}{\partial_kw_{ij}(n)}$  (11) | $_kW(n+1) = {_k}W(n) - \eta\nabla_k E(n)$  (13) |

From these local terms we can immediately calculate $_k\text{net}_i(n)$, $_ko_i(n)$, $_{k-1}\text{delta}_j(n)$, $$\frac{\partial E(_kw_{ij}(n))}{\partial_kw_{ij}(n)},$$

and the update of the weights $_kw_{ij}(n)$. But there is a catch that appears to prevent us from completing all of the calculations on a local basis. To calculate $_{k-1}\delta_j(n)$ we need to know $_{k-1}f_j'(_{k-1}\text{net}_j(n))$. This semilinear function is not local to the layer k since we have implied that $_{k-1}\text{net}_j(n)$ is local to layer k−1, so we must find some way to calculate it locally. We now turn to this problem.

We will first look at a special form of $_kf_i(x)$. We will use the sigmoid function $$_kf_i(x) = \frac{1}{1 + e^{-x}} \quad (35)$$

Differentiating equation (35) yields:

$$_kf_i'(x) = {_k}f_i(x)(1 - {_k}f_i(x)) \quad (36)$$

This form of $_kf_i'(x)$ is very useful to us. If we now look at the term that prevented us from localizing our computations for a layer, then:

$$_{k-1}f_j'(_{k-1}\text{net}_j(n)) = {_{k-1}}f_j(_{k-1}\text{net}_j(n))(1 - {_{k-1}}f_j(_{k-1}\text{net}_j(n))) \quad (37)$$

$$= {_{k-1}}o_j(n)(1 - {_{k-1}}o_j(n)) \quad (38)$$

Thus we see that we can indeed use $_{k-1}f_j'(_{k-1}\text{net}_j(n))$ on a local basis since it can be determined from $_{k-1}o_j(n)$ which is available to us on a local basis. Given this we can then subsequently calculate $_{k-1}\delta_j(n)$ as follows:

$$_{k-1}\delta_j(n) = {_{k-1}}o_j(n)(1 - {_{k-1}}o_j(n))_{k-1}\text{delta}_j(n) \quad (39)$$

We saw, in the previous paragraph, how, in a special case, we can express $_{k-1}f_j'(_{k-1}\text{net}_j(n))$ as a function of $_{k-1}o_j(n)$. We can also do the same in less special circumstances. Let us require that $_kf_i(x)$ be not only semilinear but also strictly-monotonically increasing i.e. $_kf_i(x) > {_k}f_i(y)$  x>y. Then the inverse of $_kf_i(x)$ exists and $$_{k-1}\text{net}_j(n) = {_{k-1}}f_j^{-1}(_{k-1}o_j(n)) \quad (40)$$

It then immediately follows that $$_{k-1}f_j'(_{k-1}\text{net}_j(n)) = {_{k-1}}f_j'(_{k-1}f_j^{-1}(_{k-1}o_j(n))) \quad (41)$$

So if we require that $_kf_i(x)$ be semilinear and strictly-monotonically increasing, then we may always calculate $_{k-1}f_j'(_{k-1}\text{net}_j(n))$ locally from $_{k-1}o_j(n)$ if we have local information describing $_{k-1}f_j(\ )$.

Next we will exploit the local nature of the computations of the first preferred embodiment method with a first preferred embodiment structure for its implementation.

We will first focus on the purely linear-portions of the forward pass and backward pass operations, specifically:

$$_k\text{net}_i(n) = \sum_{j=0}^{N_k-1-1} {_k}w_{ij}(n)_{k-1}o_j(n)$$

$$_{k-1}\text{delta}_j(n) = \sum_{j=0}^{N_k-1} {_k}w_{ij}(n)_k\delta_i(n)$$

We will calculate each of these sums on a partial sum basis, that is $$_ks_{i(-1)}{}^o(n) = 0 \quad (42)$$

$$_ks_{ij}{}^o(n) = {_k}s_{i(j-1)}{}^o(n) + {_k}w_{ij}(n)_{k-1}o_j(n) \quad (43)$$

$$_k\text{net}_i(n) = {_k}s_{i(N_k-1-1)}{}^o(n) \quad (44)$$

$$j = 0, 1, \ldots, N_k-1-1 \quad (45)$$

and $$_ks_{-1j}{}^\delta(n) = 0 \quad (46)$$

$$_ks_{ij}{}^\delta(n) = {_k}s_{(i-1)j}{}^\delta(n) + {_k}w_{ij}(n)_k\delta_i(n) \quad (47)$$

$$_{k-1}\text{delta}_j(n) = {_k}s_{(N_k-1)j}{}^\delta(n) \quad (48)$$

$$i = 0, 1, \ldots, N_k-1 \quad (49)$$

Figure 4:
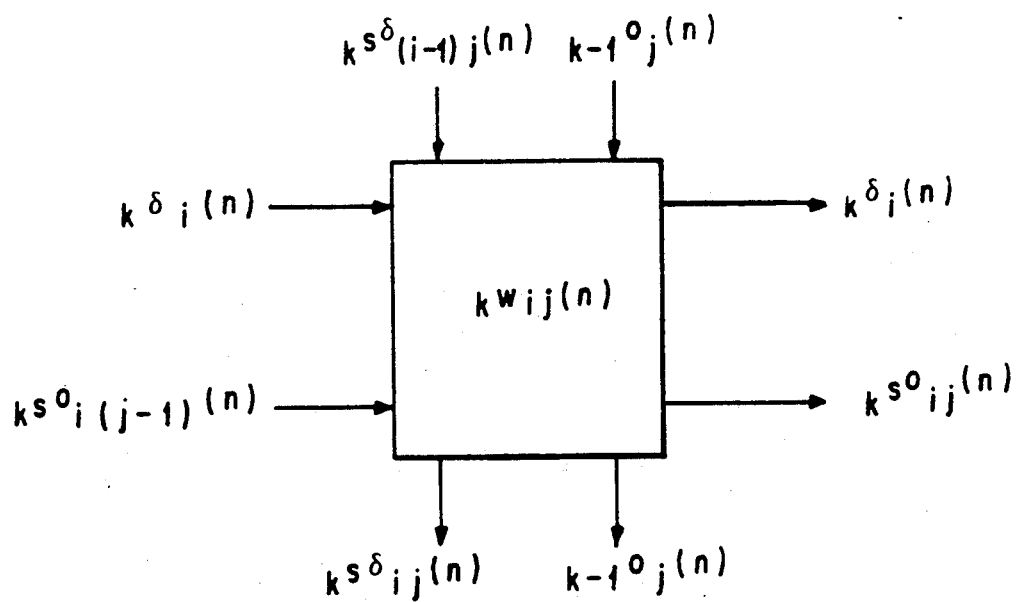
FIG. 4 illustrates a basic building block.

For a particular i, j, and k we can calculate equations (43) and (47) using the preferred embodiment computational cell shown in FIG. 4. Note that the superscript (o or δ) on the s refers to the item being computed.

This cell has inputs $_ks_{i(j-1)}{}^o(n)$, $_{k-1}o_j(n)$, $_ks_{(i-1)j}{}^\delta(n)$, and $_k\delta_i(n)$. Its current state is defined by $_kw_{ij}(n)$. It produces the outputs $_ks_{ij}{}^o(n)$ and $_ks_{ij}{}^\delta(n)$ according to (43) and (47). It updates its state according to equations (19) and (11): $_kw_{ij}(n+1) = {_k}w_{ij}(n) - \eta_k\delta_i(n)_{k-1}o_j(n)$. Since the form of the computation for $_ks_{ij}{}^o(n)$, $_ks_{ij}{}^\delta(n)$, and $_kw_{ij}(n+1)$ is the same, the same basic circuitry may be used to perform all three computations.

Figure 5A:
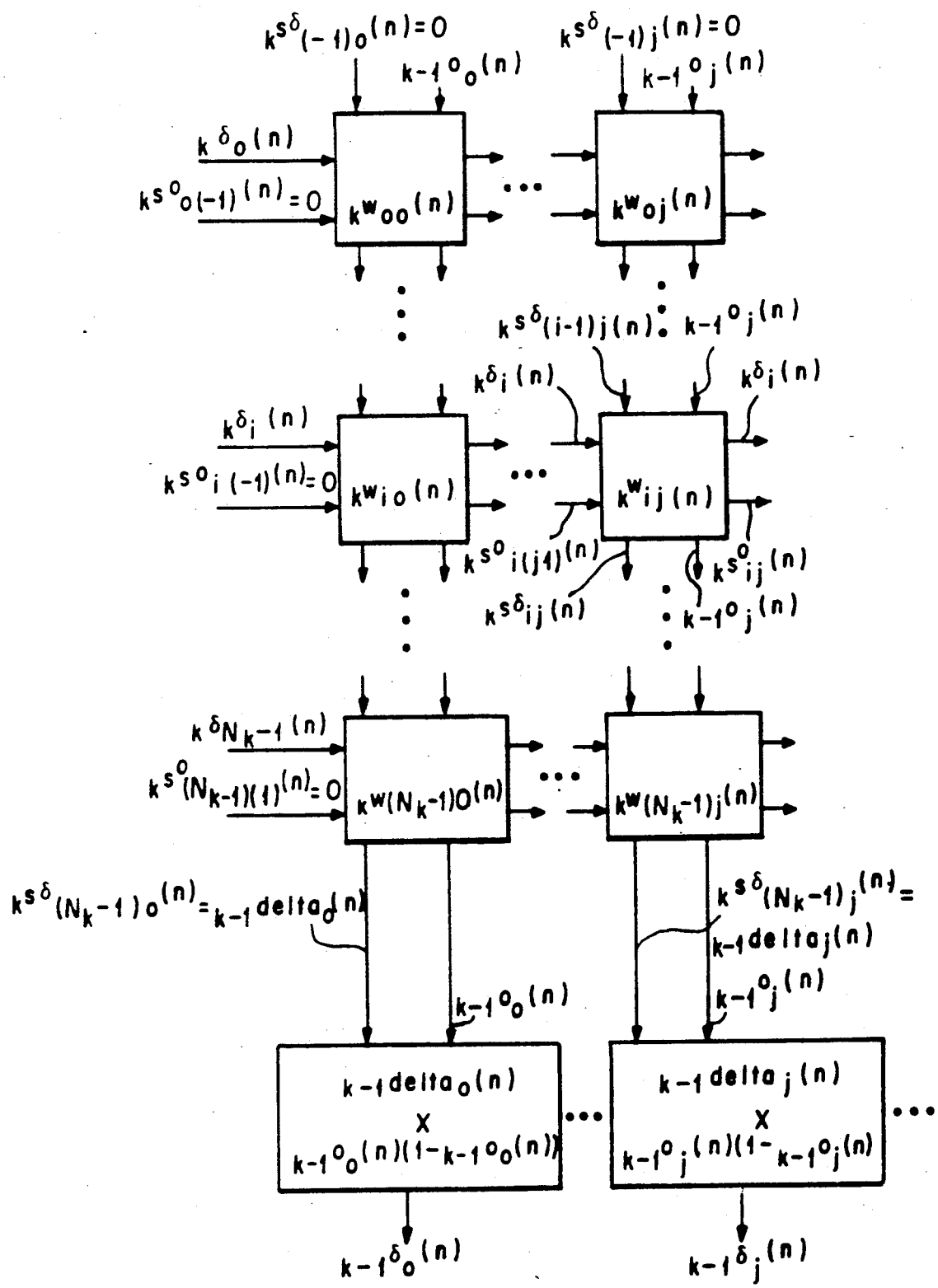
FIGS. 5a and b is a two-dimensional array for calculation.
Figure 5B:
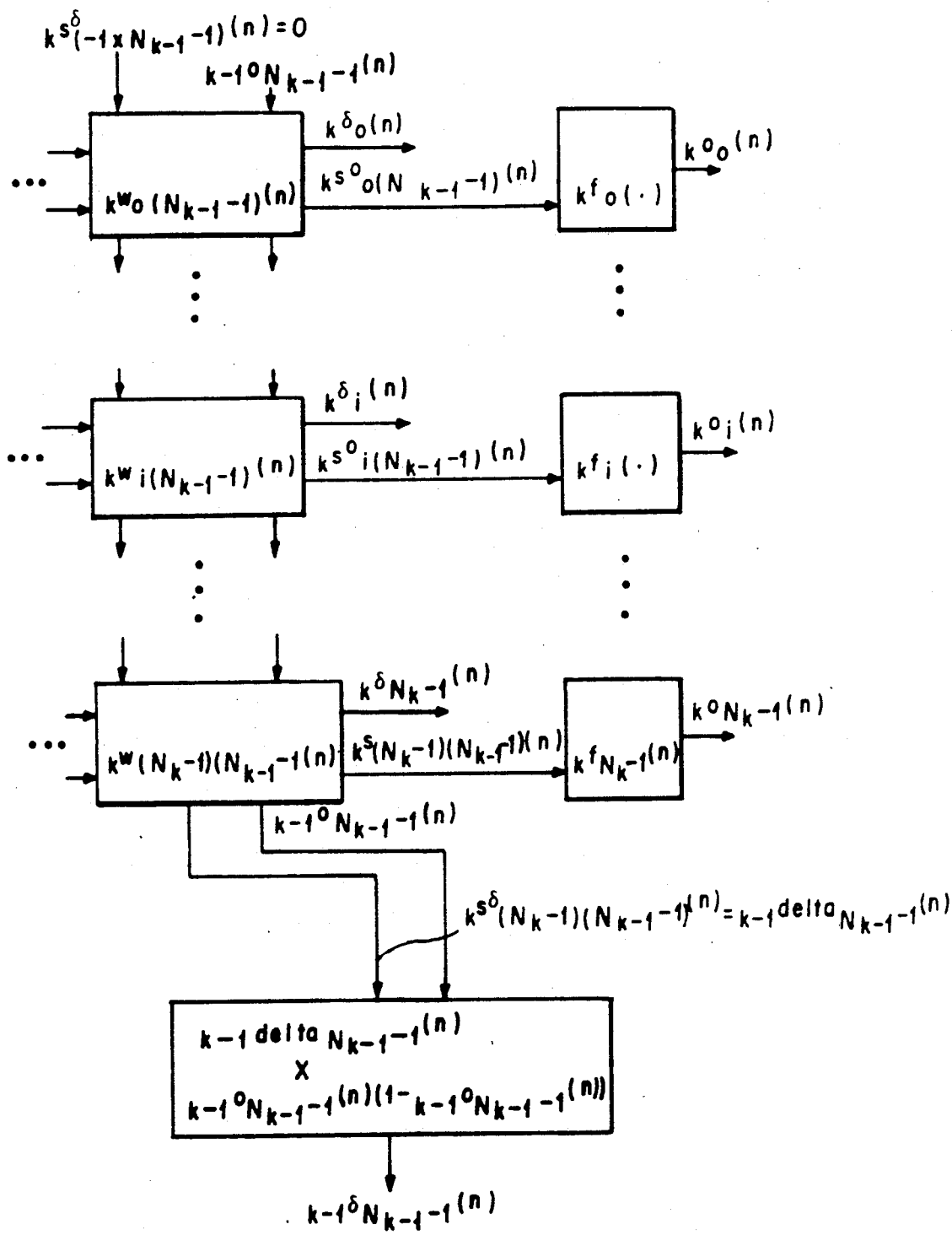

Constructing a two-dimensional array of these cells we can calculate equations (44), (48), (2), and (31). The first preferred embodiment array to do this is shown in FIG. 5 and would correspond to layer k in FIGS. 2 and 6. The bottom border-row calculates equation (31) and the rightmost column calculates equation (2).

The first preferred embodiment architecture shown in FIG. 5 has several important features:

1. All computations are done locally and all communication is to the nearest neighboring cells.
2. The regular structure makes it simple to expand the number of inputs and outputs for a layer composed of these simple cells. This is done by simply adding more rows and columns as required for the application.
3. The uniform, two-dimensional structure is ideal for implementations based upon existing analog and digital VLSI technology.

4. As wafer-scale integration becomes more of a practical technology, this structure is an ideal candidate for a wafer-scale implementation.

Figure 6:
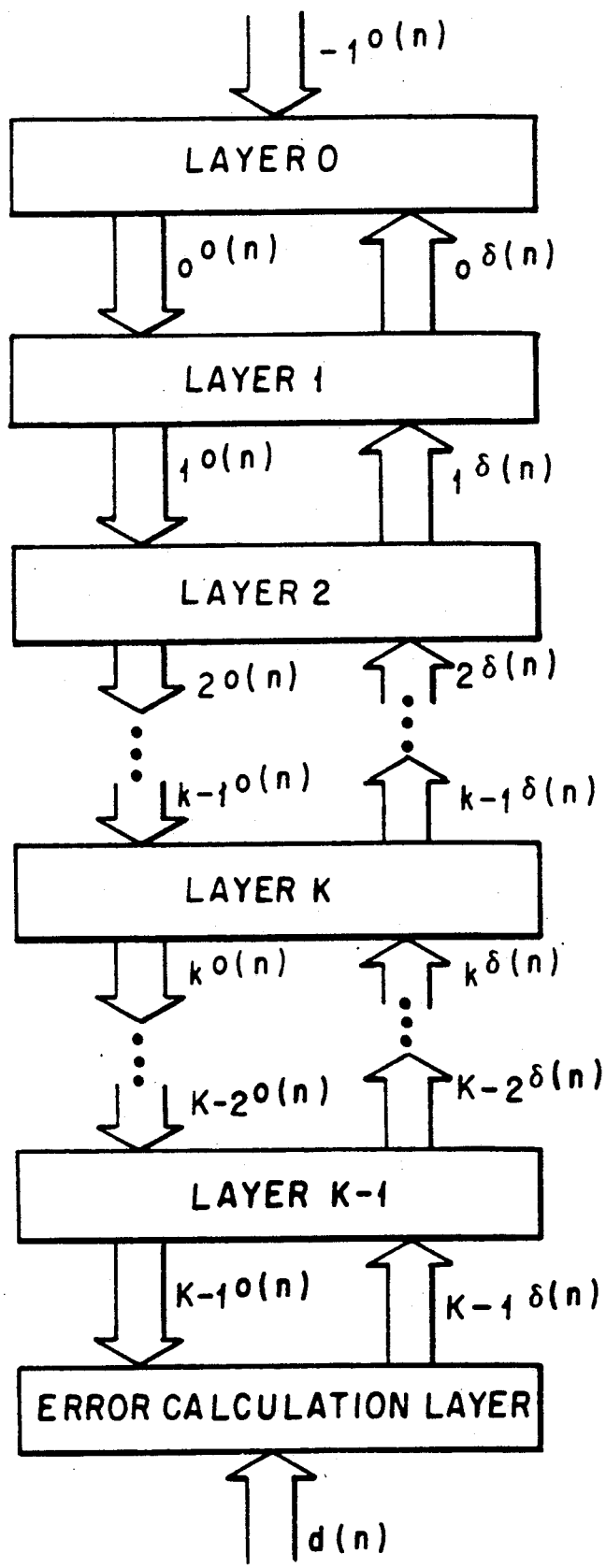
FIG. 6 shows a learning network constructed from the two-dimensional array of FIG. 5.

We can combine layers of these two dimensional first preferred embodiment arrays to form complete first preferred embodiment learning networks as shown in FIG. 6. Layer k in FIG. 6 is constructed of a two-dimensional array and has the associated vector inputs and outputs. Note that this figure also shows the use of an error calculation layer. Next we discuss what this layer does and how it might be implemented.

The error calculation layer shown in FIG. 6 calculates $_{K-1}\delta(n)$ given the output $_{K-1}o(n)$ and the target vector d(n). The target vector is defined as:

$$d(n) = \begin{bmatrix} d_0(n) \\ d_1(n) \\ \vdots \\ d_j(n) \\ \vdots \\ d_{N_{K-1}-1}(n) \end{bmatrix} \quad (50)$$

The target vector is an input to the network which specifies the desired output of the network in response to an input. Recall that the error term for layer K−1 is given by equation (34):

$$_{K-1}\delta_j(n) = \frac{\partial E(_k w_{ij}(n))}{\partial_{K-1}o_j(n)} \, _{K-1}f'(_{K-1}\text{net}_j(n))$$

And if we use the sigmoid function in equation (35) then $$_{K-1}\delta_j(n) = \frac{\partial E(_k w_{ij}(n))}{\partial_{K-1}o_j(n)} \, _{K-1}o_j(n)(1 - \, _{K-1}o_j(n)) \quad (51)$$

Figure 7:
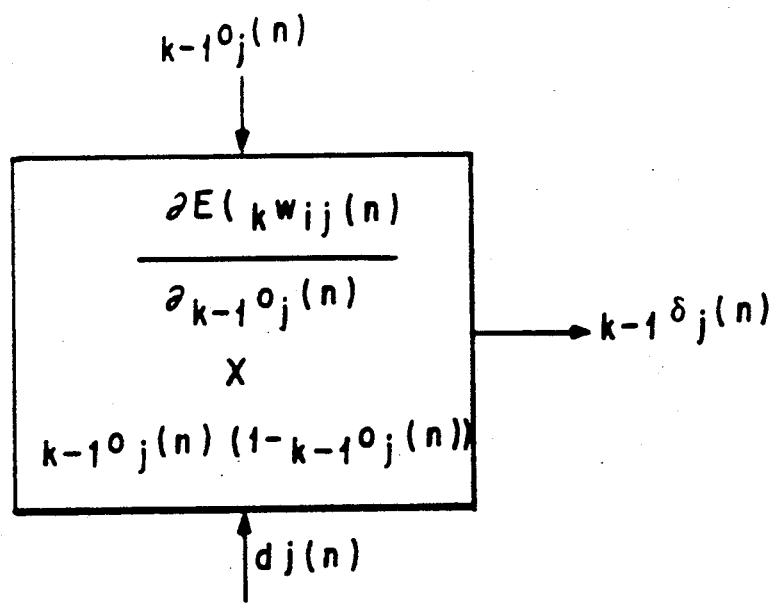
FIG. 7 shows a unit for error calculation.

A unit to implement this equation is shown in FIG. 7.

The most common form of error measure used is the square error:

$$E(_k w_{ij}(n)) = \tfrac{1}{2} \sum_{j=0}^{N_{K-1}-1} (d_j(n) - \, _{K-1}o_j(n))^2 \quad (52)$$

Then $$\frac{\partial E(_k w_{ij}(n))}{\partial_{K-1}o_j(n)} = -(d_j(n) - \, _{K-1}o_j(n)) \quad (53)$$

Another form of error is to take an exponentially-weighted average of past values of the square error:

$$E(_k w_{ij}(n)) = \sum_{t=0}^{n} h^{n-t} \left( \tfrac{1}{2} \sum_{j=0}^{N_{K-1}-1} (d_j(t) - \, _{K-1}o_j(t))^2 \right) \quad (54)$$

where $0 < h < 1$.

Then $$\frac{\partial E(_k w_{ij}(n))}{\partial_{K-1}o_j(n)} = - \sum_{t=0}^{n} h^{n-t}(d_j(t) - \, _{K-1}o_j(t)) \quad (55)$$

In this case, the error can be calculated locally by locally averaging the same error term calculated for the square error case.

In both cases the error term can be calculated on a local basis with a simple functional unit.

Figure 8A:
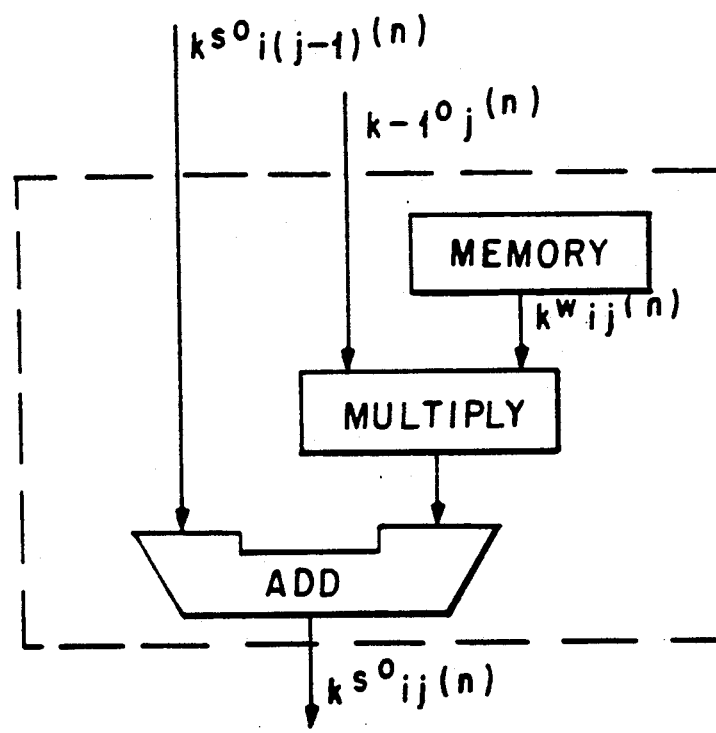
FIGS. 8a-c illustrate flow graphs for the computations.
Figure 8B:
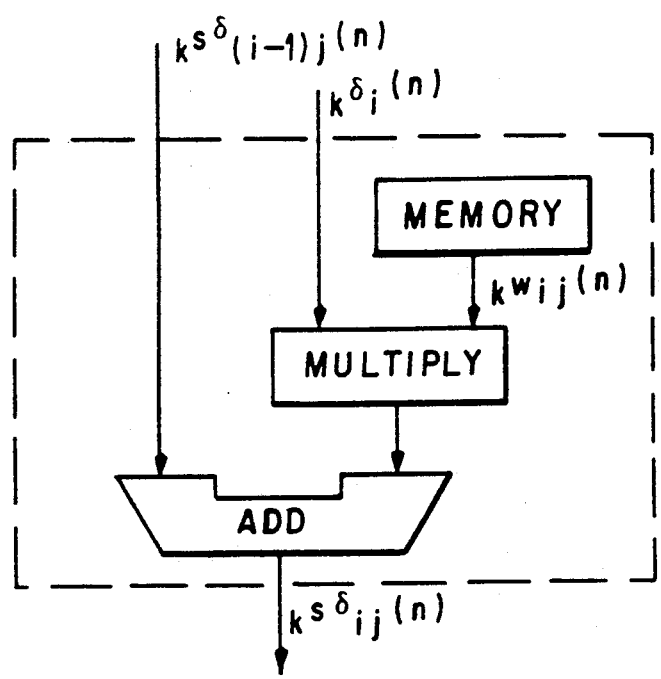
Figure 8C:
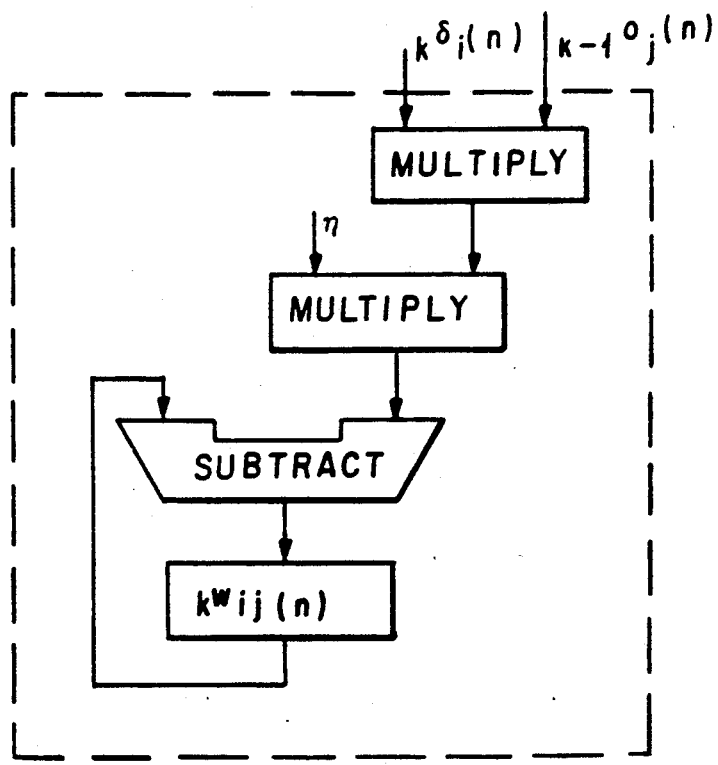
Figure 9:
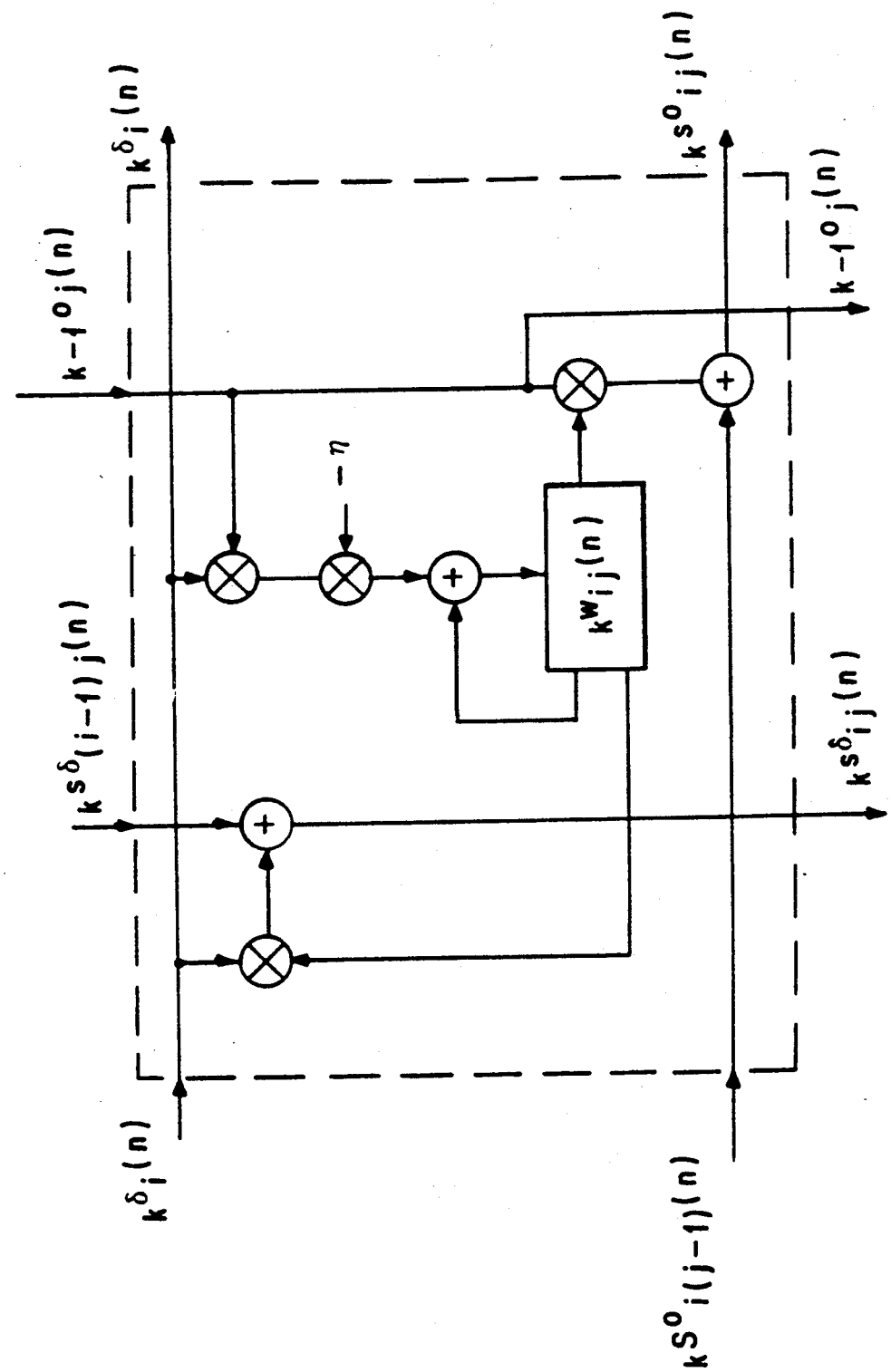
FIG. 9 shows a realization of the block of FIG. 4.

The first preferred embodiment computational cell shown in FIG. 4 includes memories for the current (time n) values of $_k w_{ij}$ and $_{k-1}o_j$ which are updated on each backward and forward pass, respectively. The cell also includes multiply and accumulate circuits for the partial sums and for the updating. In more detail, FIG. 8a is a flow graph for the computation of equation (43), FIG. 8b is a flow graph for the computation of equation (47), and FIG. 8c is a flow graph for the computation of equations (11) and (19) updating the state variables (weights). Combining these flow graphs provides a realization of the computational cell of FIG. 4 as illustrated in FIG. 9. The time evolution of the cells is obtained by $\eta$ and the state variable $_k w_{ij}(n)$.

Figure 10:
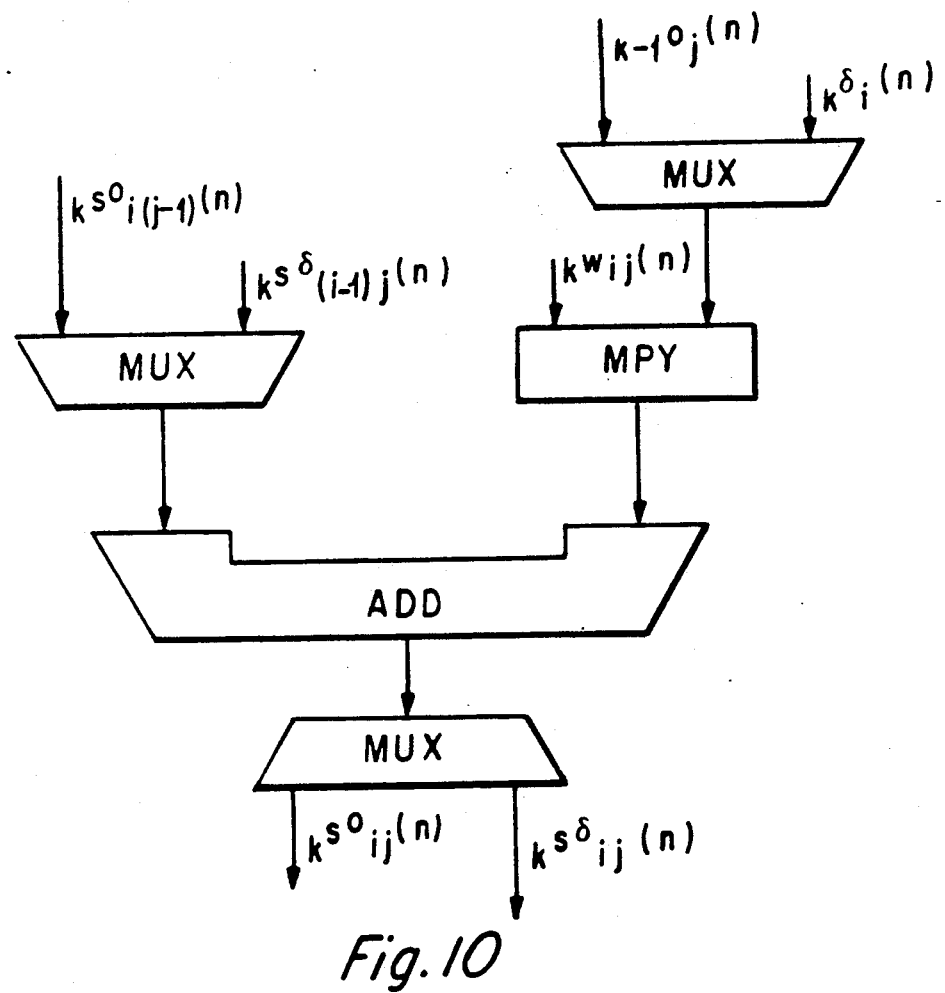
FIG. 10 illustrates reduction in number of computation elements for a realization.

FIG. 10 is a modified version of the cells of FIGS. 8a-b where use of multiplexers has reduced the number of multipliers from two to one and the number of adders from two to one. Where the leftmost inputs/outputs are selected in the multiplexers, equation (43) is computed; whereas selection of the rightmost inputs/outputs computes equation (47). Similarly, including further multiplexers can reduce the number of computational elements in the full cell of FIG. 9.

The first preferred embodiment array of FIG. 5 is made of such cells plus the righthand column of processors that have $_k f_i$ stored in ROM (EEPROM) for computations of the outputs and the bottom row of processors that just add and multiply.

While the first preferred embodiment method is philosophically the same as the original GDR, it is algorithmically different in several fundamental ways; most notably for its localization of calculations and communication and its error-criteria independence.

These features were used to formulate the first preferred embodiment network architecture. In this architecture all computations can be performed on a local basis and using only nearest-neighbor communication. Furthermore, the first preferred embodiment computational cells support the construction of learning networks from simple two-dimensional arrays. The cells and arrays are particularly well suited for implementation in analog or digital VLSI technology.

Another important new result of the first preferred embodiment is that the architecture of the network is completely independent (except for the last layer) of the particular error criterion employed. Such a robust architecture will make it simpler to construct networks and to analyze the effect of different error criteria. This independence increases the importance of the cells used since they can be used in a wide variety of networks and not just a limited niche of learning networks.

MODIFICATIONS AND ADVANTAGES

Various modifications of the preferred embodiment devices and methods may be made while retaining the features of local layer computation by nearest neighbor simple cells.

Common processing for the forward and backward pass computations permits simple architecture, and various device types may be used for the processors such as general purposes processors, discrete digital procesors, analog processors, and quantum effect devices.

The advantages of the present invention include the localized computation that permits large scale integration of the processors (units) and the common processing for the forward and backward pass computations for reduction of total amount of hardware logic required.

What is claimed is:

1. A learning network, comprising:
   (a) a plurality of computational layers labelled by index k with $0 \leq k \leq K-1$ for a positive integer K and a sequence of positive integers $N_k$, each of said k layers including an array of computation cells arranged into rows and columns and labelled (i,j) with $0 \leq i \leq N_k - 1$ and $0 \leq j \leq N_{k-1} - 1$, each of said cells connected within layer k to its nearest neighbors only,
   (b) interconnection from cell (i, $N_{k-1}-1$) of layer k to cell (0,i) of layer k+1 for each i;
   (c) interconnection from cell ($N_{k+1}-1$, i) of layer k+1 to cell (i,0) of layer k for each i;
   (d) external input connections for computation cells (0,j) of layer 0; and
   (e) an error computation layer with inputs connected from cell (i,$N_{K-1}-1$) for each i of layer K−1 and outputs connected to cell (i,0) for each i of layer K−1.

2. The network of claim 1, wherein:
   (a) each of said computation cells includes a memory for storing a state variable.

3. The network of claim 1, wherein:
   (a) each of said rows of computation cells provides partial sum computation.

4. The network of claim 1, wherein:
   (a) each of said columns of computation cells provides partial sum computation.

5. The network of claim 1, wherein:
   (a) for each layer k each of said (i,$N_{k-1}-1$) cells includes a forward output cell and an arithmetic cell, each of said ($N_k-1$,j) cells includes a backward output cell and an arithmetic cell, and each of said (i,j) cells includes an arithmetic cell, wherein all of said arithmetic cells are structurally the same.

6. The network of claim 5, wherein:
   (a) each of said forward output cells including a memory for storing a semilinear function.

7. The network of claim 5, wherein:
   (a) each of said arithmetic cells includes first, second, third, and fourth inputs and first, second, third, and fourth outputs with data entering said first input passing unchanged out said first output, data entering said second input passing unchanged out said second output, data entering said third input modified by addition of the product of data entering said second input and a stored state variable and passing out said third output, and data entering said fourth input modified by addition of the product of data entering said first input and said stored state variable and passing out said fourth output.

8. The network of claim 7, wherein:
   (a) each of said arithmetic cells modifies said stored state variable by addition of the product of data entering said first input and data entering said second input multiplied by a negative constant.

* * * * *